Patented Jan. 13, 1953

2,625,537

UNITED STATES PATENT OFFICE 2,625,537

DIAZOTHIOETHERS IN EMULSION POLYMERIZATION

Izaak M. Kolthoff and Wesley J. Dale, Minneapolis, Minn., assignors to Phillips Petroleum Company, a corporation of Delaware Application June 2, 1947, Serial No. 751,954

14 Claims. (Cl. 260—84.1)

This invention relates to the polymerization of unsaturated organic compounds capable of undergoing polymerization reactions to form high molecular weight polymers. In one of its specific aspects it relates to the polymerization in aqueous emulsion of a conjugated diolefin, either alone or with a monomer copolymerizable therewith, by a method wherein a novel additive agent comprising a ferricyanide-diazo thioether-mercaptan composition is employed to perform the function of an initiator and modifier for the reaction. In another aspect the invention relates to ferricyanide-diazo thioether-mercaptan compositions to be employed in polymerization recipes to reduce the temperature and/or time required to carry out polymerization reactions. The invention also relates to a polymerization process to produce polymers of high quality and superior processing characteristics.

In present day processes for the manufacture of synthetic rubber wherein the monomeric raw material is emulsified with an aqueous medium in the presence of a suitable emulsifying agent to provide a reaction mixture for the production of a synthetic latex, primary consideration must be given to the quality of the resultant polymeric product, especially as regards tack, cohesiveness, and milling characteristics. Two important factors to be considered in the preparation of polymers which possess the desired properties are temperature and reaction time. In processes used for the manufacture of butadiene-styrene copolymers, such as those of the Buna-S type, it is well known that the quality of the product is rapidly degraded with increasing reaction temperature and that as the temperature is decreased the quality of the polymeric product improves. However, if the reaction temperature is adjusted to give a polymer of optimum characteristics, the rate of polymerization is reduced to such an extent that the process becomes impractical for large scale production. It is therefore apparent that present methods for carrying out emulsion polymerization processes leave much to be desired and that any means for increasing reaction rates, particularly at lower temperature levels than are now considered practical, would be an advantageous contribution to the art of emulsion polymerization.

We have now found that the rate of emulsion polymerization reactions can be materially increased and that reaction temperatures can be markedly lowered through the employment of novel ferricyanide-diazo thioether-mercaptan compositions in polymerization recipes. These additive compositions are particularly effective in polymerization systems involving conjugated diolefins in admixture with other polymerizable organic compounds such as the butadiene-styrene system employed in the manufacture of Buna-S type polymers. Regardless of the particular polymerization system involved, the manner of accomplishing the increased reaction rate is substantially the same.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene) bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to increase the reaction rate in polymerizing unsaturated organic compounds in aqueous emulsion.

An additional object of this invention is to use a diazo thioether in the production of polymeric products of high molecular weight.

A still further object of this invention is to produce synthetic rubber by an improved emulsion polymerization of a monomeric material in the presence of a diazo thioether.

Another object of this invention is to provide a novel polymerization composition.

Other objects and advantages of this invention will become apparent, to one skilled in the art, from the accompanying disclosure and discussion.

Conventional practice in emulsion polymerization comprises the emulsification in water, in the presence of a suitable emulsifying agent, of a suitable monomeric material capable of being polymerized, an initiator, a catalyst, and a modifier. The initiator generally used is either an organic peroxide or an inorganic peroxidic material, usually employed in combination with a modifying agent such as a mercaptan. In one commonly used system a water-soluble oxidant such as potassium persulfate is added to the reaction mixture in conjunction with an oil soluble mercaptan which, according to theory, is oxidized, possibly in the aqueous or soap phase, to a mercaptan-free radical which initiates polymer chain growth by combining with a monomer unit. The use of an oxidant such as potassium persulfate is considered to have certain undesirable features inasmuch as the oxidant is likely to enter into certain side reactions. In our process oxidants such as potassium persulfate, organic peroxides, and the like are not required and, therefore, the disadvantages arising from their use are avoided.

The conventional polymerization technique as employed in the production of butadiene-styrene copolymers comprises the emulsification of butadiene, styrene, soap, potassium persulfate, water, and a mercaptan. One widely used recipe employs the various materials in the following proportions:

| | Parts by weight |
|---|---|
| Butadiene | 75 |
| Styrene | 25 |
| Potassium persulfate | 0.3 |
| Soap | 5 |
| Water | 180 |
| Mercaptan | Variable |

Polymerization is effected at about 50° C. for a period of about 12 hours, after which the resultant latex is treated with an antioxidant such as phenyl-beta-naphthylamine, coagulated, and dried. This formulation is hereinafter referred to as the conventional polymerization recipe.

In a general embodiment our invention comprises the preparation of an emulsion by agitating a monomeric material, such as a mixture of butadiene and styrene, with a suitable emulsifying agent, a ferricyanide-diazo thioether-mercaptan composition, and water. During the course of the reaction emulsification of the reactants is maintained by any conventional agitating means. The resultant latex is treated with an antioxidant such as phenyl-beta-naphthylamine, coagulated, and dried.

The properties of the products obtained according to the method of this invention may be controlled within wide limits, depending upon the diazo thioether, the mercaptan, the emulsifying agent, the operating temperature, and numerous other variables which may be introduced, such as method of addition of the diazo thioether (e. g., injection at intervals during the conversion), changes in the ratio of the different reactants employed, variations in the means and rate of agitation, use of buffered systems (e. g., the addition of alkaline materials, and the like. Buffered systems are especially advantageous when soaps which vary in pH are employed as emulsifying agents. Another advantage lies in the fact that greatly accelerated reaction rates are obtained by the addition of alkaline materials such as sodium hydroxide, sodium phosphate, etc., to the polymerization recipe.

The ferricyanides which are applicable for use in the additive compositions herein described are those of the alkali metals including ammonium. However potassium ferricyanide is most generally preferred. The amount of ferricyanide will generally be in the range of about 0.03 to about 1 part per 100 parts of monomeric material with a preferred range between about 0.05 and 0.5 part. The amount of this and other catalyst constituents in any particular case will, of course, be somewhat dependent upon the amounts of other constituents, and optimum amounts can be readily determined by one skilled in the art.

The diazo thioethers used in the process of the present invention have the general structural formula $$R-N=N-S-R'$$

where R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. These diazo thioethers may be prepared by the combination of a diazotized aromatic amine and an aromatic, cycloalkyl, or aliphatic mercaptan, including substituted derivatives.

The diazo thioethers preferred for use in our ferricyanide-diazo thioether-mercaptan compositions are those in which both R and R' in the foregoing structural formula are aromatic or substituted aromatic groups. Examples of the preferred compounds are substituted benzene diazo mercapto naphthalenes, benzene diazo mercapto benzenes, naphthalene diazo mercapto benzenes, and naphthalene diazo mercapto naphthalenes. Preferred substituent groups are the alkyl, alkoxy, aryloxy (e. g., phenoxy), carboxy, sulfonic acid, halo, and nitro groups. Other substituents give diazo thioethers of varying degrees of usefulness. Among the diazo thioethers which may be conveniently employed in our polymerization process the following compounds are included: 2-(p-methoxybenzene diazo mercapto)-naphthalene, 2-(p-chlorobenzene diazo mercapto)-naphthalene, 2-(p-methylbenzene diazo mercapto)-naphthalene, and the coupling products of diazotized sulfanilic acid with thio-p-cresol and thio-beta-naphthol. The diazo thioethers herein described may be either the water soluble or oil soluble type. Among preferred compounds are those more fully described in an application by Reynolds and Cotten, Serial No. 641,866, filed January 17, 1946, now Patent 2,501,692, granted March 28, 1950.

The type and amount of diazo thioether employed in our additive compositions will depend largely upon the results desired in a given polymerization recipe as well as upon the other components of the composition. In general the amount varies in the range of 0.05 to 2.0 parts by weight, with a range of 0.1 to 0.4 part being most frequently preferred.

The mercaptans applicable for use in this invention comprise those of primary, secondary, and tertiary configuration containing from four to twenty carbon atoms per molecule with those containing from six to sixteen carbon atoms per molecule being most generally preferred. While tertiary mercaptans are most widely used and in many cases are most desirable, primary and secondary mercaptans are sometimes advantageous.

Figure 1:
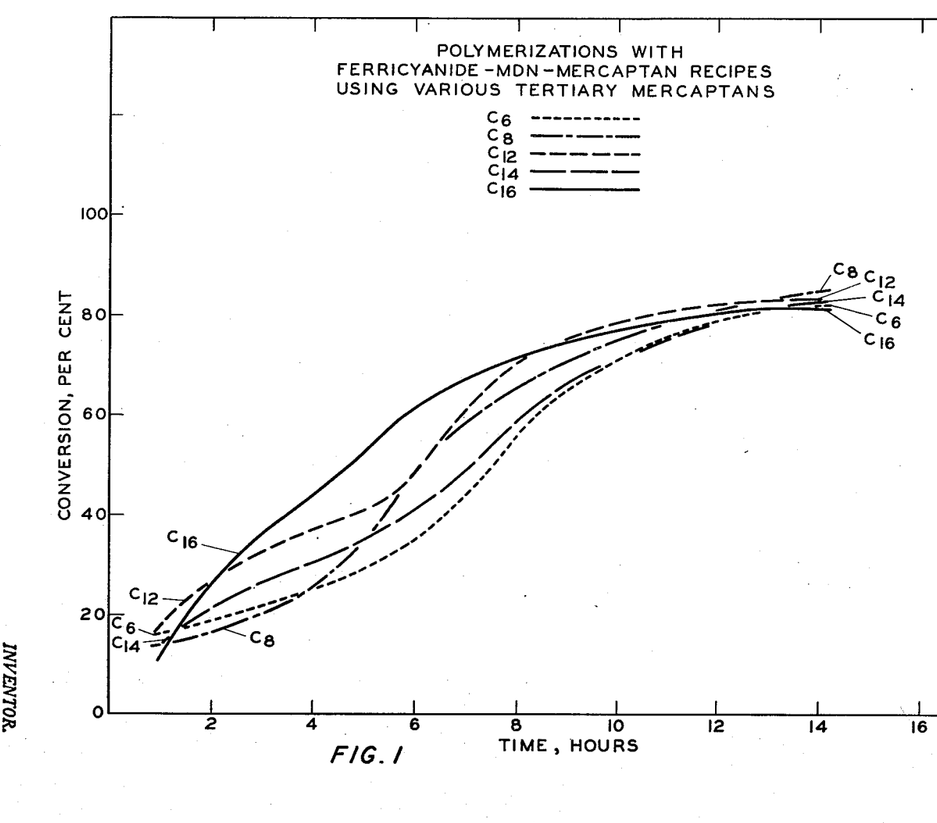

The various alkyl mercaptans are not equivalent in their action as modifiers when employed in our additive compositions but a striking resemblance is observed in the conversion rate, after the initial polymerization stage has passed, when compounds varying over a wide molecular weight range are used. The differences in modifying action make it possible to obtain variations in properties of the polymer by employing different mercaptans or blends of mercaptans without the disadvantage of widely varying conversion rates. For example, a means of control of polymer viscosity is afforded through a choice of mercaptans or mercaptan blends. It is especially noteworthy that when some of the higher molecular weight mercaptans are employed, such as those in the $C_{14}$ to $C_{16}$ range, polymers of an almost constant viscosity are obtained. As hereinbefore stated, even though marked differences in modifying effect are observed, as the reaction proceeds there is a pronounced similarity in conversion rates with mercaptans of varying molecular weights, and this is particularly true for those compounds in the $C_6$ to $C_{16}$ range. This fact is illustrated graphically in Figure 1. Mercaptans of lower molecular weight than the $C_6$ compounds may also be employed in certain instances in our additive compositions. These low molecular weight materials produce a high degree of modification but the conversion rate is slower than that accomplished with the higher molecular weight compounds. In the conventional butadiene-styrene polymerization recipe mercaptans in the low molecular weight range, such as the $C_4$ to $C_3$ compounds, in most instances cause such a pronounced retardation in the conversion rate that their use is generally considered inadvisable if not entirely impractical.

The quantity of mercaptan employed in the ferricyanide-diazo thioethermercaptan additive compositions of this invention will vary depending upon the molecular weight and purity of the material as well as upon the results desired. For example, when tertiary $C_{12}$ mercaptan is used, the amount generally varies within the range of 0.05 to 1.40 parts per 100 parts of monomers charged, with the narrower range of 0.1 to 0.45 part being most frequently preferred. In each case when another mercaptan is chosen, the amount used is equivalent to the amount of tertiary $C_{12}$ mercaptan which would normally be employed in that particular recipe.

Emulsifying agents which are suitable for use in this invention comprise partially or completely neutralized fatty acid soaps, rosin soaps, sodium lauryl sulfate, sodium isobutyl naphthalene sulfonate, sodium ditertiary butyl naphthalene sulfonate, sulfated and sulfonated succinic esters, and the like. Numerous variations in quantity and type of emulsifying agents may be introduced and satisfactory results obtained when carrying out polymerization reactions according to the method herein described. In some instances combinations of emulsifying agents are chosen in order to control the conversion rate, particularly during the early stages of the polymerization. While fatty acid soaps are widely used in our process, rosin soaps from various sources are also applicable and frequently give unexpected results. Thus, rosin soaps which are of reputed low activity in the conventional formula give good conversion rates when employed in our process. For example, sodium rosinates which give about 50 per cent conversion in 14 hours in the conventional recipe at 50° C. give about 85 per cent conversion in 12 hours at 40° C. in the ferricyanide-diazo thioether-mercaptan recipe of the present invention. Rosin soaps of both purified and commercial grades, rosin soaps formed in situ, dehydrogenated rosin soaps, and rosin soaps in admixture with excess rosin acids or with fatty acid soaps may all be employed when carrying out polymerization reactions according to our preferred method. Polymers prepared with rosin soap have a marked amount of tack as compared with polymers of the same conversion prepared by the conventional recipe. Even though unusually rapid conversion rates are frequently realized when polymerization reactions are carried out using rosin soaps as emulsifying agents, there is a surprising lack of tendency to form gel.

The amount of emulsifying agent employed is generally about 5.0 parts per 100 parts of monomers charged. However, in some instances smaller quantities are preferred depending upon the polymerization conditions, the type and amount of diazo thioether and mercaptan used, and the results desired.

When carrying out polymerization reactions according to the ferricyanidediazo thioether-mercaptan recipes herein described, the addition of various alkaline-reacting materials, such as free bases or inorganic salts, is often found advantageous. The effect of these basic substances is to produce accelerated conversion rates, the amount of acceleration being dependent upon the kind and amount of alkaline-reacting material added as well as on the emulsifying agent employed in the given recipe. Free bases, such as the alkali metal hydroxides, are frequently used as well as alkaline-reacting inorganic salts belonging to the group comprising the alkali metal carbonates, phosphates, borates, and the like. When a fatty acid soap is employed as the emulsifying agent, a base such as sodium hydroxide is found to produce a somewhat greater accelerating effect than sodium salts such as, for example, the carbonate or the phosphate, and the effect of the carbonate is generally greater than that of the phosphate. In the presence of different emulsifying agents these alkaline materials behave differently. For example, with some of the succinic esters, such as the sodium salt of sulfonated diamyl succinate, the presence of sodium hydroxide is less desirable than sodium salts such as the carbonates, borates, and phosphates. These alkaline agents are particularly valuable when carrying out low temperature polymerizations and make such methods operable which would otherwise be too slow for plant practice.

The amount of alkaline-reacting material employed in carrying out the polymerization reactions of this invention is variable and any range stated for one material will not necessarily apply to other substances which might be added. When sodium hydroxide is added to a recipe wherein a fatty acid soap is used as the emulsifying agent, the amount will usually vary from about 0.15 to about 0.35 part per 100 parts of monomers. When inorganic salts are used instead of a free base, larger quantities are necessary in order to accomplish similar results, the amount frequently being as large as about 2.5 to about 3.0 parts, or even higher.

One of the important advantages of our invention is that polymerizations may be carried out at lower temperatures than are normally employed in other polymerization processes. When operating according to the method of this invention a reaction temperature may be chosen within a wide range, up to about 70° C. with a temperature between about 0 to about 40° C. frequently preferred. The term "aqueous emulsion" should be construed to include the use of an aqueous medium comprising water alone or together with any desired amount of a water-soluble component. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Instead of carrying out the polymerization at a constant temperature, it is sometimes considered desirable to begin the reaction at a lower temperature and increase it after conversion has passed the initial rapid stage. For example, a very convenient and satisfactory rate of conversion is realized when the polymerization is begun at 30° C. and continued at that temperature up to about 25 per cent conversion, after which the temperature is elevated to 40° C. for the remainder of the reaction.

The operating temperature is dependent upon a number of variables, among which may be mentioned the diazo thioether and mercaptan employed in the ferricyanide-diazo thioether-mercaptan composition, the emulsifying agent, the presence or absence of an alkaline-reacting inorganic material, and the like. Since alkaline-reacting materials have a pronounced accelerating effect upon our polymerization reactions, they are particularly valuable in low temperature operations. Also, when operating at temperatures as low as 0° C. up to about 20° C., rosin soaps are generally used as the emulsifying agent instead of fatty acid soaps.

In carrying out polymerization reactions according to this invention, it is generally observed that the conversion rate is particularly high during the early stages of the reaction but decreases as the reaction proceeds. In the interest of maintaining a more constant polymerization rate small quantities of the diazo thioether may, if desired, be injected at intervals during the course of the polymerization, for example, at 20 and 40 per cent conversions, respectively.

Much more rapid conversion rates are obtained when the three-component compositions of this invention are employed than when either a ferricyanide-diazo thioether or a ferricyanide-mercaptan composition is used. For example, butadiene-styrene copolymerizations carried out with a composition prepared from potassium ferricyanide and 2-(p-methoxybenzene diazo mercapto)-naphthalene give conversions of only 10 to 15 percent at the end of a twelve-hour reaction period at 50° C., while similar polymerizations with a ferricyanide-tertiary $C_{12}$ mercaptan composition give conversions of 30 to 35 per cent in the same reaction period. When the compositions of our invention are employed much more rapid conversion rates are obtained at temperatures below 50° C., and in the presence of alkaline reacting materials an even greater acceleration is produced.

In addition to the advantages hereinbefore mentioned, there are other points in favor of using our ferricyanide-diazo thioether-mercaptan compositions for carrying out polymerization reactions. At the low conversion temperatures made possible through the use of our additive agents, the polymer is of superior quality and the tendency to form gel at high conversions is much less pronounced than is observed when other polymerization methods are employed.

Advantages of this invention are illustrated by the following examples. The reactants, and their proportions, and the other specific ingredients of the recipes are presented as being typical and should not be construed to limit the invention unduly.

*Example I*

A butadiene-styrene copolymer was prepared using the following recipe:

| | Parts by weight |
|---|---|
| Butadiene | 75 |
| Styrene | 25 |
| Potassium ferricyanide | 0.3 |
| 2-(p-methoxybenzene diazo mercapto) naphthalene[1] | 0.2 |
| Tert-dodecyl mercaptan | 0.35 |
| Sodium sulfate | 0.3 |
| Soap flakes | 5.0 |
| Water | 180 |

[1] The diazo thioether employed in this recipe is designated as MDN.

The reaction mixture was charged to a reactor where the contents were agitated continuously while the temperature was held at 50° C. At the conclusion of the reaction the latex was stabilized in the conventional manner with phenyl-beta-naphthylamine, coagulated, and dried. A conversion of 74 per cent, based upon the weight of starting monomers, was obtained in a three-hour period. The product was a soft, well modified rubber which was soluble in benzene. The intrinsic viscosity was 2.5.

Two additional runs were carried out as above except that in the first run the mercaptan was omitted and in the second the diazo thioether was omitted. The temperature was held at 50° C. At the end of a 12-hour period a monomer conversion of 11 per cent was realized in the first case and 33 per cent in the recipe carried out in the absence of the diazo thioether.

*Example II*

The recipe of Example I was employed for the preparation of a butadiene-styrene copolymer. The same procedure was followed except that a polymerization temperature of 40° C. was used. The time-conversion relationships as well as the intrinsic viscosity at each conversion level are tabulated below:

| Time, hours | Conversion, percent | Intrinsic viscosity |
|---|---|---|
| ¼ | 11.3 | 1.20 |
| ½ | 19.4 | 1.24 |
| 1 | 26.1 | 1.20 |
| 6 | 4.8.8 | 1.24 |
| 9 | 75.1 | 1.91 |
| 10 | 80.8 | 2.02 |
| 12 | 86.3 | 2.04 |
| 14 | 90.3 | 2.04 |
| 16 | 91.8 | |

The polymers, with the exception of that formed at 91.8 per cent conversion, were all completely soluble in benzene while the highest conversion product contained only a small amount of gel.

A sample of butadiene-styrene copolymer was prepared according to the conventional recipe using tertiary $C_{12}$ mercaptan as the modifier. The reaction temperature was held at 50° C. A monomer conversion of 36 per cent was realized in 6 hours and 73 per cent in 12 hours.

Figure 2:
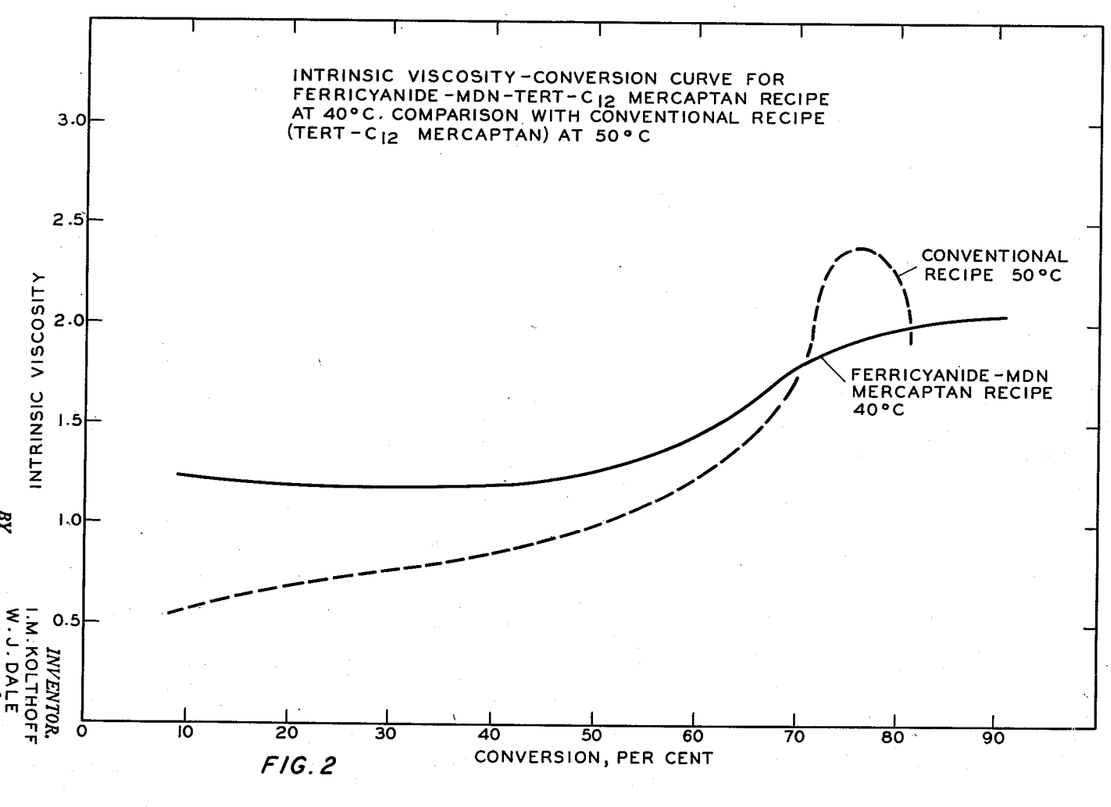

Figure 2 shows in graphical form the intrinsic viscosity-conversion data obtained in this run. It is to be noted that there is no maximum in the curve, thus indicating lack of gel formation at conversions as high as 90 per cent. The regularity in the curve also indicates uniformity of modification and, therefore, a good quality of product. The dotted curve shows intrinsic viscosity-conversion data obtained when a polymer was prepared according to the conventional formula.

*Example III*

A series of polymerization reactions was carried out using the recipe of Example I except that different tertiary mercaptans were employed for each experiment. In each case the amount of mercaptan used was equivalent (in mols) to 0.35 per cent tertiary $C_{12}$ mercaptan. The temperature throughout each polymerization was held at 40° C. A summary of the conversion data is given in the following table:

| Time, hours | Mercaptan | | | | |
|---|---|---|---|---|---|
| | Tert-$C_6$ | Tert-$C_8$ | Tert-$C_{12}$ | Tert-$C_{14}$ | Tert-$C_{16}$ |
| 1 | 17 | 15 | 20 | 16 | 12 |
| 2 | 20 | 18 | 29 | 22 | 23 |
| 4 | 26 | 26 | 38 | 31 | 45 |
| 6 | 34 | 49 | 48 | 41 | 64 |
| 8 | 56 | 66 | 71 | 60 | 72 |
| 10 | 72 | 76 | 79 | 72 | 78 |
| 12 | 79 | 82 | 83 | 80 | 82 |
| 14 | 84 | 86 | 85 | 85 | 83 |

These data show the applicability of a wide variety of mercaptans when ferricyanide-diazo thioether-mercaptan recipes are employed for carrying out polymerization reactions. The similarity in conversion rate is also shown by reference to Figure 1.

Intrinsic viscosity determinations were made on samples of the butadiene-styrene copolymers prepared using the same ferricyanide-diazo thioether-mercaptan recipes at 40° C. and employing the various mercaptans given in the above table. In each case the amount of mercaptan employed was equivalent (in mols) to 0.35 per cent tertiary $C_{12}$ mercaptan except in the case of tertiary $C_{16}$ mercaptan when one-half this equivalent was used. The tabulation which follows gives a summary of these data.

| Conversion, percent | Mercaptan | | | | |
|---|---|---|---|---|---|
| | Tert-$C_6$ | Tert-$C_8$ | Tert-$C_{12}$ | Tert-$C_{14}$ | Tert-$C_{16}$ |
| 10 | 0.38 | 0.50 | 1.20 | 2.12 | 2.4 |
| 25 | .59 | .60 | 1.17 | 2.00 | 2.3 |
| 40 | .80 | .72 | 1.12 | 2.00 | 2.4 |
| 60 | 1.21 | 1.36 | 1.32 | 2.10 | 2.8 |
| 70 | 1.70 | 1.87 | 1.68 | 2.20 | 2.8 |
| 74 | 1.96 | 2.07 | 1.80 | 2.26 | 2.7 |
| 78 | 2.25 | 2.25 | 1.89 | 2.31 | 2.6 |
| 82 | 2.44 | 2.36 | 1.95 | 2.36 | 2.3 |
| 86 | 2.36 | 2.36 | 2.00 | 2.39 | |
| 90 | 1.90 | 2.20 | 2.00 | 2.40 | |

Figure 3:
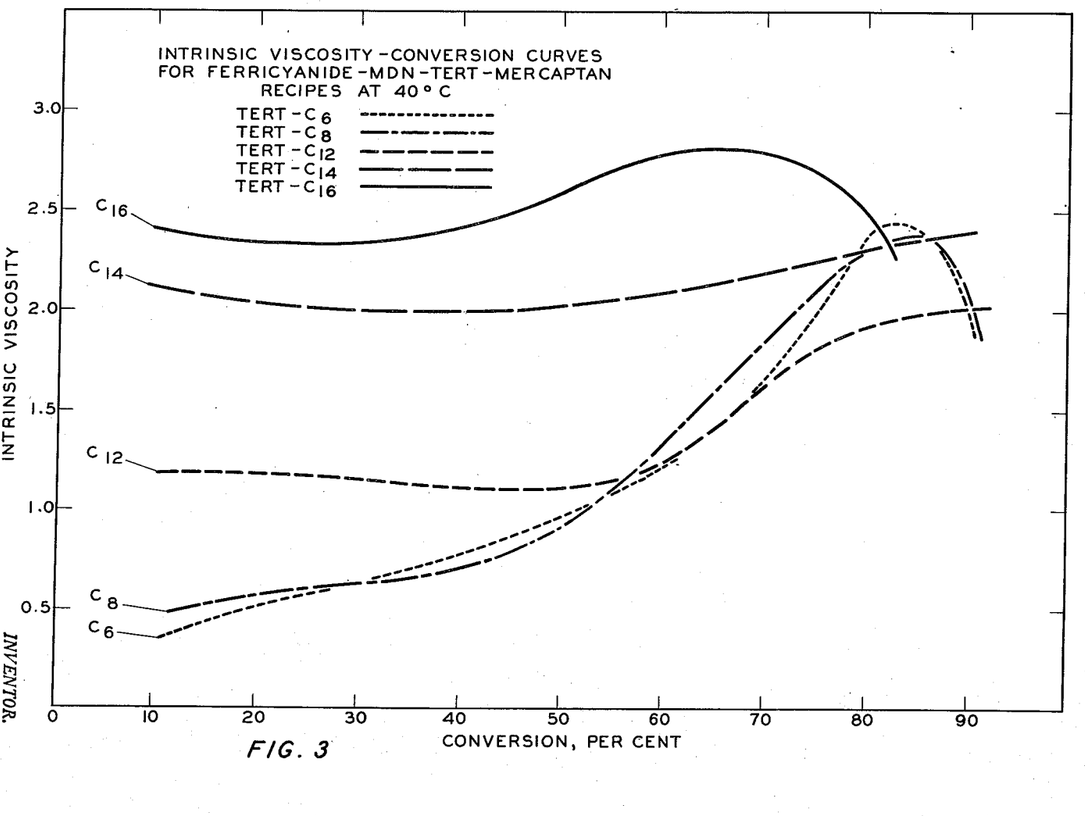

Figure 3 shows these data in graphical form. An almost constant viscosity polymer is obtained with tert-$C_{14}$ and tert-$C_{16}$ mercaptans, a fact which indicates a uniformity of molecular weight of polymer throughout the course of the reaction. The variation in intrinsic viscosity with different mercaptans shows that one method of controlling polymer viscosity is afforded through a choice of mercaptans.

*Example IV*

Two sets of polymerization runs were carried out using the following mercaptans: primary hexyl, tertiary hexyl, and tertiary octyl. In one set of runs the ferricyanide-diazo thioether-mercaptan recipe was employed comprising 75 parts butadiene, 25 parts styrene, 0.3 part potassium ferricyanide, 0.2 part 2-(p-methoxybenzene diazo mercapto)-naphthalene (commonly designated as MDN), 0.3 part sodium sulfate, 5.0 parts soap, 180 parts water, and the selected mercaptan. A temperature of 40° C. was employed. In the second set of runs the conventional recipe, comprising 75 parts butadiene, 25 parts styrene, 5.0 parts soap, 0.3 part potassium persulfate, 180 parts water, and the selected mercaptan, was employed. The temperature was maintained at 50° C. The amount of mercaptan used in all cases was substantially the same, the molar quantity being equivalent to 0.35 part tertiary $C_{12}$ mercaptan. Satisfactory conversion rates were realized in the cases where the ferricyanide-diazo thioether mercaptan recipe was used while considerable retardation resulted with the conventional formula. The following results were obtained after a 12-hour conversion period:

| Mercaptan used | Ferricyanide-MDN[1]-mercaptan recipe at 40° C. | Conventional recipe at 50° C. |
|---|---|---|
| | Percent | Percent |
| Tert-$C_6$ | 79 | 21 |
| Primary $C_8$ | 83 | 50 |
| Tert-$C_8$ | 82 | 68 |

[1] MDN = 2-(p-methoxybenzene diazo mercapto) naphthalene.

*Example V*

The recipe of Example I was employed for carrying out a series of four runs using different diazo thioethers. The amount of each diazo thioether used was 0.2 part per 100 parts of monomers and the operating temperature was 40° C. A product similar to that of Example I was obtained in each case. The results of these reactions, at six-, nine-, and twelve-hour conversion periods, are recorded in the table which follows:

| Diazo thioether | Conversion, percent | | | Intrinsic viscosity at— | | |
|---|---|---|---|---|---|---|
| | 6 hrs. | 9 hrs. | 12 hrs. | 6 hrs. | 9 hrs. | 12 hrs. |
| 2-(p-chlorobenzene diazo mercapto) naphthalene | 57 | 60 | 61 | 1.15 | 1.18 | 1.19 |
| 2-(p-methylbenzene diazo mercapto) naphthalene | 64 | 71 | 79 | 1.20 | 1.80 | |
| Coupling product of diazotized sulfanilic acid with thio-p-cresol | 48 | 57 | 65 | 1.10 | 1.15 | 1.17 |
| Coupling product of diazotized sulfanilic acid with thio-beta-naphthol | 31 | 47 | 62 | 1.30 | 1.40 | 1.45 |

*Example VI*

The effect of varying the concentration of the diazo thioether in ferricyanide-diazo thioether-mercaptan additive compositions to be used in polymerization reactions was determined by employing a polymerization recipe containing 0.3 part potassium ferricyanide, 0.35 part tertiary dodecyl mercaptan, 0.1 to 1.0 part 2-(p-methoxybenzene diazo mercapto)-naphthalene (MDN), 75 parts butadiene, 25 parts styrene, 5 parts soap, and 180 parts water. In all runs 0.3 part sodium sulfate was included to decrease the viscosity of the latex. A series of parallel reactions was carried out in which the diazo thioether was used in concentrations of 0.1, 0.2, 0.3, 0.5, and 1.0 part, respectively. A temperature of 50° C. was employed throughout all tests. The following table shows the percentage conversions at different time intervals when the various diazo thioether concentrations were used:

| Time, hours | MDN concentrations, parts per 100 parts monomers | | | | |
|---|---|---|---|---|---|
| | 0.1 | 0.2 | 0.3 | 0.5 | 1.0 |
| 1 | 37 | 50 | 57 | 55 | 45 |
| 2 | 42 | 64 | 73 | 73 | 74 |
| 3 | 46 | 72 | | | |

As is shown in the table, the accelerating effect of the diazo thioether used increases with the concentration up to 0.3 part per 100 parts of monomers charged.

*Example VII*

The recipe of Example I was employed and the reaction carried out at 30° C. After a 24-hour period the polymerization was discontinued. The percentage conversion at various time intervals is shown below:

| Time, hours | Conversion, percent |
|---|---|
| 4 | 25 |
| 12 | 40 |
| 18 | 77 |
| 24 | 86 |

*Example VIII*

Samples of butadiene-styrene copolymer were prepared according to the following recipe:

| | Parts by weight |
|---|---|
| Butadiene | 75 |
| Styrene | 25 |
| Potassium ferricyanide | 0.3 |
| 2-(p-methoxybenzene diazo mercapto) naphthalene | 0.2–0.6 |
| Primary $C_{12}$ mercaptan | 0.5 |
| Soap flakes | 5.0 |
| Emulsion stabilizer[1] | 1.0 |
| Water | 180 |

[1] A condensation product of formaldehyde with an aryl sulfonic acid, available to the trade as "Daxad 11."

Six runs using this recipe were made, three at a temperature of 50° C. and the remaining three at 30° C. Concentrations of diazo thioether of 0.2, 0.4, and 0.6 parts, respectively, were used in polymerizations carried out at each temperature level. The following table shows the percentage conversions at different time intervals and at the two temperature levels using varying amounts of the diazo thioether (MDN):

| | Time, hours | MDN concentration, parts per 100 parts monomers | | |
|---|---|---|---|---|
| | | 0.2 | 0.4 | 0.6 |
| (50° C.) | 1 | 70 | 75 | 76 |
| | 2 | 75 | 82 | 76 |
| (30° C.) | 3 | 67 | 74 | 78 |
| | 5 | 77 | 83 | 81 |

These results show that when primary dodecyl mercaptan is employed in the ferricyanide-MDN-mercaptan additive compositions, unusually high conversion rates are obtained. It has been further observed in this series of runs that when the higher concentrations of the diazo thioether are employed, the polymers are 100 per cent benzene-soluble, while at the higher conversions with lower diazo thioether concentrations there is frequently some evidence of gel formation.

*Example IX*

An emulsion comprising 75 parts butadiene, 25 parts styrene, 0.3 part potassium ferricyanide, 0.5 part primary dodecyl mercaptan, 5.0 parts soap, and 180 parts water was prepared and the mixture agitated at 40° C. during the course of the polymerization.

After a period of five hours 0.2 part 2-(p-methoxybenzene diazo mercapto)-naphthalene (MDN) in benzene was injected into the charge and the polymerization continued at 40° C. A similar run was made in which 0.2 part of the diazo thioether was injected after an eight-hour reaction period and the polymerization again continued at 40° C. Controls were run in each case. The data presented below show the accelerating effect of the diazo thioether. It is seen that this accelerating effect occurs during the various stages of the reaction independent of whether soap miscelles or polymer particles serve as loci of the polymerization. It is assumed that no free soap miscelles remain in the latex after an eight-hour conversion period.

|  | Total time, hours | Conversion, percent |
|---|---|---|
| A. Control (no MDN) | 5 | 20 |
|  | 7 | 33 |
|  | 9 | 38 |
| MDN injected after 5 hours | 7 | 76 |
|  | 9 | 85 |
| B. Control (no MDN) | 8 | 39 |
|  | 10 | 47 |
|  | 12 | 57 |
| MDN injected after 8 hours | 10 | 79 |
|  | 12 | 87 |

*Example X*

An emulsion of 75 parts butadiene, 25 parts styrene, 0.3 part potassium ferricyanide, 0.2 part 2-(p-methoxybenzene diazo mercapto)-naphthalene, 0.35 part tertiary dodecyl mercaptan, and 0.3 part sodium sulfate in 180 parts water was prepared using 5.0 parts of the sodium salt of sulfonated diamyl succinate (currently available as "Aerosol AY") as the emulsifying agent. Sodium sulfate (0.3 part) was added to the recipe to decrease the viscosity of the latex. The reactants were agitated and the temperature was maintained at 40° C. throughout the reaction. After a six-hour reaction period the conversion had reached 40 per cent and after 12 hours it had increased to 72 per cent. The product obtained at the conclusion of the reaction period was benzene-soluble and had an intrinsic viscosity of 1.42.

*Example XI*

An emulsion was prepared as in Example X using the same reactants except that 5.0 parts sodium-di-tert-butyl naphthalene sulfonate was employed at the emulsifying agent. Polymerization was effected in the conventional manner while the temperature was maintained at 40° C. The following conversions at various time intervals were obtained: 2 hours, 19 per cent; 6 hours, 56 per cent; 12 hours, 67 per cent; 14 hours, 70 per cent.

*Example XII*

The effect of alkaline agents in ferricyanide-diazo thioether-mercaptan polymerization recipes was investigated. An emulsion containing 75 parts butadiene, 25 parts styrene, 0.3 part potassium ferricyanide, 0.35 part tertiary dodecyl mercaptan, 0.2 part 2-(p-methoxy-benzene diazo mercapto)-naphthalene (MDN), 5.0 parts soap, and 180 parts water was prepared. Four parallel runs were made. To the first was added 0.25 part sodium hydroxide, to the second 1.0 part sodium carbonate ($Na_2CO_3$), to the third 2.34 parts sodium phosphate ($Na_3PO_4 \cdot 12H_2O$), and to the fourth 0.3 part sodium sulfate ($Na_2SO_4$). The last run was used as a control. The polymerization temperature employed throughout all the reactions was 30° C. The following results were obtained:

|  | Time, hours | Conversion, percent |
|---|---|---|
| NaOH | ½ | 37 |
|  | 1 | 60 |
|  | 2 | 82 |
| $Na_2CO_3$ | 2 | 40 |
|  | 4 | 72 |
|  | 6 | 75 |
| $Na_3PO_4$ | 2 | 71 |
|  | 4 | 73 |
|  | 6 | 78 |
| $Na_2SO_4$ | 2 | 20 |
|  | 4 | 25 |
|  | 6 | 28 |

Figure 4:
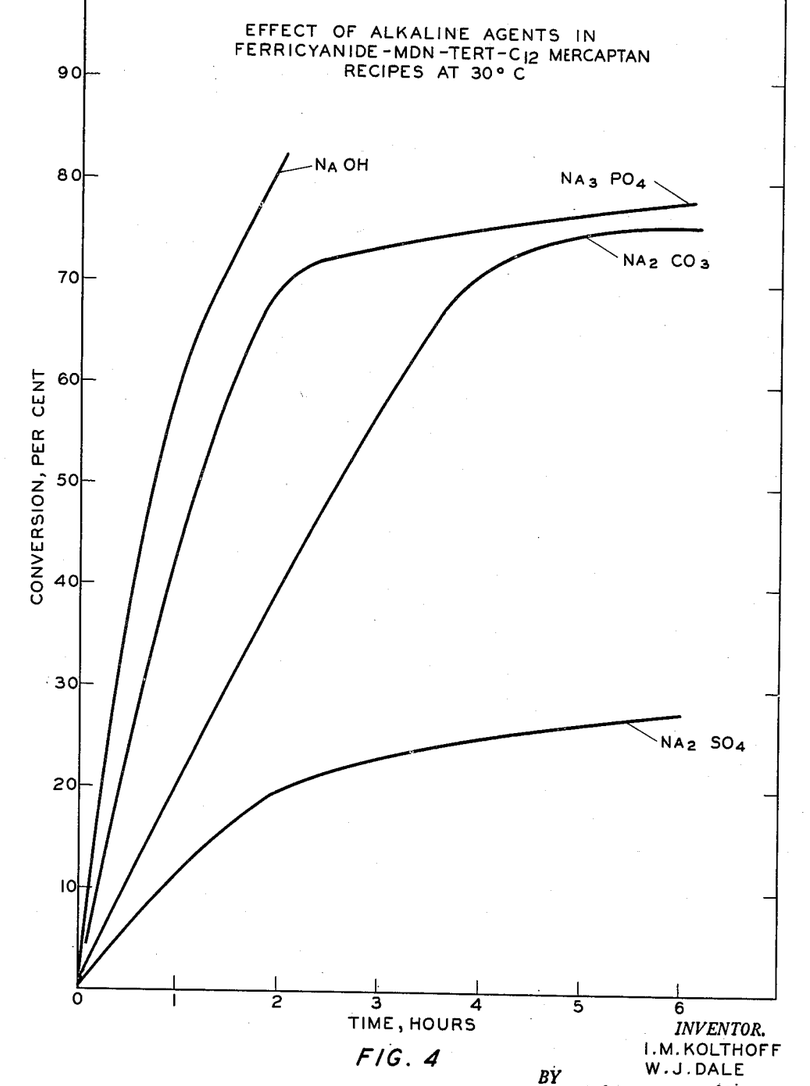

These results are shown graphically in Figure 4.

*Example XIII*

The use of the sodium salt of sulfonated diamyl succinate (currently available as "Aerosol AY") as the emulsifying agent in ferricyanide-diazo thioether-mercaptan recipes in which alkaline reacting materials are present is illustrated by the following recipe: 75 parts butadiene, 25 parts styrene, 0.3 part potassium ferricyanide, 0.2 part 2-(p-methoxybenzene diazo mercapto)-naphthalene (MDN), 0.35 part tert-$C_{12}$ mercaptan, 1.0 part sodium carbonate, 5.0 parts of the sodium salt of sulfonated diamyl succinate, and 180 parts water. The emulsion of the reactants was prepared and polymerization then carried out at 40° C. A conversion of 76 per cent was obtained in a five-hour period. The polymer was dried 24 hours at 80° C. in vacuo after which the benzene solubility was determined. Solubility of the product was substantially complete. A similar product was obtained by using the same recipe but substituting 2.0 parts borax for the sodium carbonate. A 75 per cent conversion was realized at the end of a five-hour reaction period. When 2.34 parts sodium phosphate ($Na_3PO_4$) was employed as the alkaline material, a 68 per cent conversion was reached in eight hours and the product was 100 per cent soluble in benzene. It is thus seen that very rapid conversion rates at 40° C. are obtained using alkaline materials in recipes in which a sodium salt of sulfonated diamyl succinate is employed as the emulsifying agent.

*Example XIV*

A series of three butadiene-styrene copolymerizations was carried out according to the procedure of Example I and using the same recipe except that the concentration of soap was varied. The temperature was held at 40° C. throughout the reaction. The following table shows the time-conversion data with three different soap concentrations:

| Time, hours | Percent conversion with varying amounts of soap | | |
|---|---|---|---|
|  | 5.0 parts | 2.5 parts | 1.25 parts |
| 2 | 36 | 17 | 11 |
| 4 | 41 | 21 | 19 |
| 5 | 47 | 25 | 22 |
| 6 | 55 | 31 | 28 |
| 7 | 60 | 47 | 33 |
| 8 | 65 | 55 | 39 |
| 9 | 74 | 64 | 47 |
| 10 | 79 | 68 | 51 |
| 11 | 83 | 74 | 56 |
| 12 | 86 | 78 | 58 |
| 13 | 88 | 82 | 59 |
| 14 | 90 | 82 | 65 |
| 15 | 91 | 84 | 70 |

Figure 5:
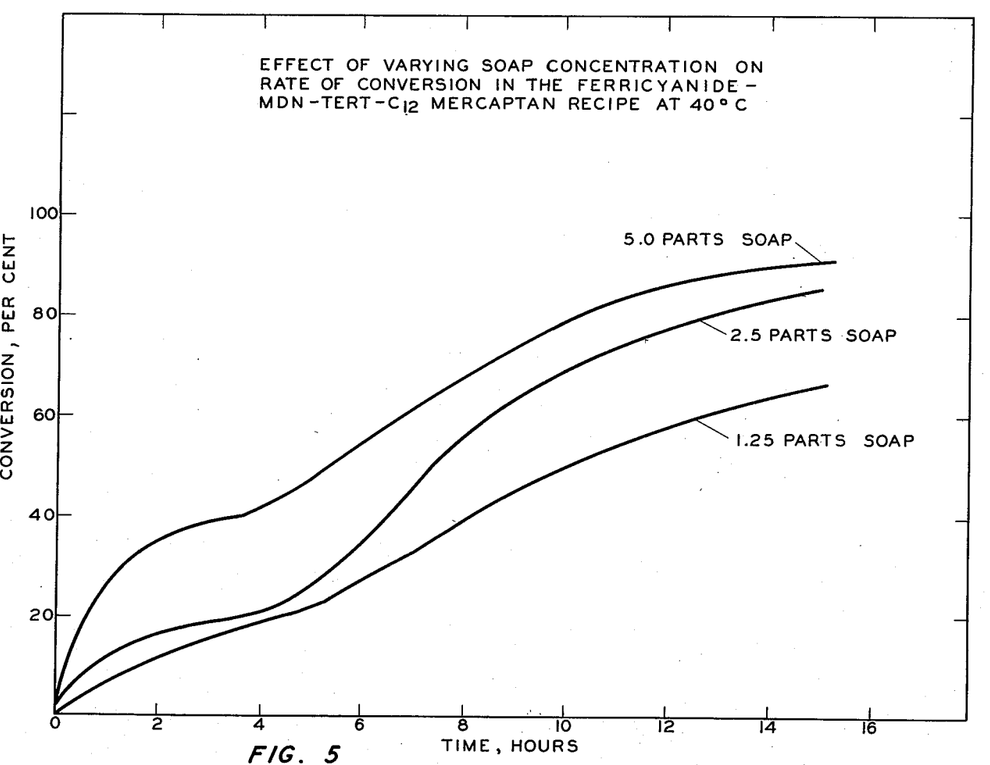

The effect of different concentrations of soap is shown graphically in Figure 5.

*Example XV*

Two polymerization runs were carried out at 40° C. using the recipe given in Example I, except that in the first test 0.35 part mercaptan was employed in the ferricyanide-diazo thioether-mercaptan additive composition and in the other 0.70 part mercaptan was used. At the end of a four-hour reaction period the conversions were 31 and 67 per cent, respectively, while at the end of twelve hours the conversions had reached 86 and 89 per cent.

*Example XVI*

A polymer was prepared by the copolymerization of butadiene and styrene using the formula given in Example I. The temperature was held at 30° C. during the first four hours of the reaction and increased to 40° C. during the remainder of the polymerization. The data are presented in the following tabulation:

| Total hours | Hours at 30° C. | Hours at 40° C. | Conversion, percent | Intrinsic viscosity |
|---|---|---|---|---|
| 4 | 4 | 0 | 26 | 0.74 |
| 6 | 4 | 2 | 38 | 0.79 |
| 9 | 4 | 5 | 67 | 1.28 |
| 13 | 4 | 9 | 86 | 2.14 |
| 16 | 4 | 12 | 90 | 2.20 |

*Example XVII*

A polymerization reaction was carried out using a commercial grade of rosin soap as the emulsifying agent instead of a fatty acid soap. With the exception of the emulsifying agent, the recipe of Example I was employed and the polymerization temperature was maintained at 40° C. The following results were obtained:

| Time, hours | Conversion, percent | Intrinsic viscosity |
|---|---|---|
| 2 | 48 | 1.26 |
| 6 | 68 | 1.53 |
| 8 | 75 | 1.69 |
| 12 | 85 | 2.12 |
| 14 | 89 | 2.06 |
| 16 | 92 | 2.20 |

The polymer of each stage of conversion was completely soluble in benzene.

In a similar polymerization reaction 0.25 part tertiary octyl mercaptan was used instead of its equivalent of tertiary dodecyl mercaptan (0.35 part). An 86 per cent conversion was realized in 12 hours and the intrinsic viscosity of the benzene soluble polymer was 2.32. The per cent conversion increased to 92 at the end of a 14-hour reaction period.

*Example XVIII*

The ferricyanide-diazo thioether-mercaptan recipe of Example I was employed for carrying out a polymerization reaction at 40° C. except that the emulsifying agent was a rosin soap prepared in situ from a rosin acid of commercial grade. The rosin soap was prepared by the addition of sodium hydroxide, the amount employed being sufficient to neutralize 97 per cent of the rosin acid. A rapid rate of conversion was observed as is shown in the following table:

| Time, hours | Conversion, percent |
|---|---|
| 2 | 46 |
| 6 | 76 |
| 8 | 84 |
| 10 | 85 |
| 12 | 88 |

When this rosin soap was used as the emulsifying agent in the conventional recipe, a conversion of only 50 per cent was obtained in 14 hours at 50° C. The polymer samples of 85 to 88 per cent conversion had much more tack than polymers prepared by the conventional recipe at 80 per cent conversion.

*Example XIX*

A dehydrogenated rosin soap, prepared by the dehydrogenation of a rosin designated as "Scrape Gum" rosin, was employed in a polymerization reaction carried out according to the following formula: 75 parts butadiene, 25 parts styrene, 0.3 part potassium ferricyanide, 0.2 part 2-(p-methoxybenzene diazo mercapto)naphthalene (MDN), 0.25 part tertiary octyl mercaptan, 0.3 part sodium sulfate, 5.0 parts sodium rosinate (dehydrogenated rosin soap), and 180 parts water. The reactants were polymerized in the usual manner while the temperature was maintained at 40° C. A conversion of 62 per cent was obtained in 6 hours while at the end of a 12-hour reaction period the value had increased to 84 per cent. The product was 100 per cent soluble in benzene. A parallel run using the conventional butadiene-styrene polymerization recipe was made in which this dehydrogenated rosin soap was employed as the emulsifying agent. A conversion of 42 per cent was obtained after a 14-hour reaction period during which time the temperature was held at 50° C.

Other dehydrogenated rosin soaps which were prepared from dehydrogenated rosins known as "X-Gum," "N-Gum," and "N-Wood" gave conversions of 80, 83 and 77 per cent, respectively, in 12-hour polymerization periods at 40° C. All the polymers were 100 per cent soluble in benzene. These rosins showed considerable retardation when employed in the conventional recipe, the conversions being 61, 50, and 65 per cent, respectively, after a 14-hour reaction period at 50° C.

*Example XX*

The effect of excess rosin acid in the ferricyanide-diazo thioether-mercaptan recipe using a rosin soap was studied by employing the following formula:

| | Parts by weight |
|---|---|
| Butadiene | 75 |
| Styrene | 25 |
| Potassium ferricyanide | 0.3 |
| Tert.-$C_{12}$ mercaptan | 0.35 |
| 2-(p-methoxybenzene diazo mercapto)naphthalene | 0.2 |
| Sodium rosinate | 4.75 |
| Rosin acid | 0.25 |
| Sodium sulfate | 0.3 |
| Water | 180 |

The rosin acid used was a dehydrogenated material prepared from a commercial product designated as "K-Wood" rosin. The sodium rosinate was also obtained from the same source. Subsequent to the emulsification of the ingredients, the polymerization reaction was carried out at a temperature of 40° C. The results obtained are recorded in the table which follows. For the purpose of comparison a run was made using 5.0 parts sodium rosinate but no rosin acid. These results are also included in the table.

| Time, hours | Conversion, percent | |
|---|---|---|
| | 4.75 parts Na rosinate; 0.25 part rosin acid | 5.0 parts Na rosinate |
| 2 | 35 | 48 |
| 4 | 45 | 59 |
| 12 | 85 | 91 |

The values in the table show that the use of excess rosin acid with sodium rosinate offers a method for control of the conversion rate and at the same times gives a feasible rate of conversion in 12 hours.

*Example XXI*

A series of polymerizations was carried out at 0° C. using various tertiary mercaptans. In addition, an alkaline reacting material or a neutral salt was present. The following recipe was employed:

| | Parts by weight |
|---|---|
| Butadiene | 75 |
| Styrene | 25 |
| Potassium ferricyanide | 0.3 |
| 2-(p-methoxybenzene diazo mercapto)-naphthalene | 0.2 |
| Mercaptan: | |
| Tert-$C_{12}$ | 0.35 |
| or | |
| Tert-$C_8$ | 0.25 |
| or | |
| Tert-$C_{14}$ | 0.46 |
| Inorganic base or neutral salt | Variable |
| Rosin soap | 5.0 |
| Water | 180 |

The concentration of the mercaptan in each case was equivalent to 0.35 part tertiary $C_{12}$ mercaptan. The accelerating effect of the alkaline materials is clearly shown in the table below in contrast to the results obtained when the neutral salt, sodium sulfate, was present.

| Time, hours | $Na_2SO_4$, 0.3 part; tert-$C_{12}$ mercaptan | $Na_3PO_4 \cdot H_2O$, 2.34 part; tert-$C_{12}$ mercaptan | Conversion, percent; NaOH, 0.25 part | | |
|---|---|---|---|---|---|
| | | | Tert-$C_8$ mercaptan | Tert-$C_{12}$ mercaptan | Tert-$C_{14}$ mercaptan |
| 6 | 20 | 37 | 39 | 48 | 47 |
| 12 | | | 39 | 49 | 48 |
| 18 | 26 | 56 | 39 | 51 | 49 |
| 24 | | 58 | 39 | 52 | 50 |

When the primary mercaptans, n-$C_{12}$ (0.5 part) and n-$C_{14}$ (0.41 part), were employed in above recipe with sodium phosphate and sodium hydroxide, the following results were obtained: n-$C_{12}$ mercaptan with sodium phosphate, 42 per cent conversion in 18 hours; n-$C_{12}$ mercaptan with sodium hydroxide, 40 per cent conversion in 24 hours; and n-$C_{14}$ mercaptan, 39 per cent conversion in 18 hours. The polymers prepared using both primary and tertiary mercaptans were benzene soluble.

*Example XXII*

A series of polymerizations was carried out at 5° C. using tertiary $C_{12}$ mercaptan in recipes with sodium sulfate, sodium phosphate, and sodium hydroxide. The formula given in Example XXI was employed. The results are tabulated below:

| Time, hours | Conversion, percent | | |
|---|---|---|---|
| | $Na_2SO_4$ | $Na_3PO_4$ | NaOH |
| 2 | 16 | 14 | 29 |
| 4 | 25 | 28 | 49 |
| 6 | 28 | 38 | 51 |
| 12 | 31 | 52 | 54 |

As will be evident to those skilled in the art, various modifications of this invention can be made, or followed, in the light of the foregoing disclosure and discussion, without departing from the spirit or scope of the disclosure or from the scope of the claims.

We claim:

1. In the polymerization of a monomeric material comprising a major amount of 1,3-butadiene and a minor amount of styrene in an aqueous emulsion to produce a synthetic rubber, the improvement which comprises conducting said polymerization at a polymerization temperature between about 0° C. and about 50° C. in the presence of a composition comprising 0.05 to 2 parts of a diazo thioether having the formula $$R-N=N-S-R'$$

where R is a member of the class consisting of aromatic radicals and R' is a member of the class consisting of aromatic, cycloalkyl and aliphatic radicals, 0.03 to about 1 part of a water-soluble ferricyanide, 0.05 to 1.4 parts of an alkyl mercaptan having from about six to sixteen carbon atoms per molecule, all being parts by weight per 100 parts of monomeric material.

2. An improved process for the production of polymers of high molecular weight, which comprises effecting a copolymerization of a monomeric material comprising a major amount of a 1,3-butadiene and a minor amount of a vinyl aromatic compound in an aqueous emulsion and in the presence of catalytic amounts of a mixture comprising a diazo thioether having the formula $R-N=N-S-R'$ where R is a member of the class consisting of aromatic radicals and R' is a member of the class consisting of aromatic, cycloalkyl and aliphatic radicals, a water-soluble ferricyanide, and an alkyl mercaptan having from four to twenty carbon atoms per molecule, and recovering a polymeric material so produced.

3. The process of claim 2 in which said copolymerization is carried out at a reaction temperature between 0° C. and 70° C.

4. An improved process for the production of synthetic rubber, which comprises polymerizing at a polymerization temperature between about 0° C. and about 40° C. and in an aqueous emulsion a monomeric material, comprising a major amount of a 1,3-butadiene and a minor amount of styrene, in the presence of a catalytic composition comprising 0.1 to 0.5 part of a diazo thioether having the formula $R-N=N-S-R'$ where R is a member of the class consisting of aromatic radicals and R' is a member of the class consisting of aromatic, cycloalkyl and aliphatic radicals, 0.05 to 0.5 part of a ferricyanide of an alkali metal, 0.1 to 0.45 part of an alkyl mercaptan having between six and sixteen carbon atoms per molecule, all being parts by weight per 100 parts of said monomeric material, and recovering a polymeric material so produced.

5. The process of claim 4 in which said diazo thioether is 2-(p-chlorobenzene diazo mercapto) naphthalene.

6. The process of claim 4 in which said diazo thioether is 2-(p-methylbenzene diazo mercapto) naphthalene.

7. The process of claim 2 in which said diazo thioether is 2-(p-methoxybenzene diazo mercapto) naphthalene.

8. The process of claim 2 in which said diazo thioether is 2-(p-chlorobenzene diazo mercapto) naphthalene.

9. The process of claim 2 in which said diazo thioether is 2-(p-methylbenzene diazo mercapto) naphthalene.

10. A composition of matter comprising, in relative parts by weight, 0.05 to 2 parts of a diazo thioether having the formula R—N=N—S—R' where R is a member of the class consisting of aromatic radicals and R' is a member of the class consisting of aromatic, cycloalkyl and aliphatic radicals, 0.03 to 1 part of a water-soluble ferricyanide, and 0.05 to 1.4 parts of an alkyl mercaptan having from six to sixteen carbon atoms per molecule.

11. In the process of producing a synthetic rubber by the copolymerization in an aqueous emulsion of a monomeric material comprising a major amount of 1,3-butadiene and a minor amount of styrene, the improvement which comprises conducting said polymerization in the presence of a composition comprising 0.3 parts of potassium ferricyanide, 0.2 part of 2-(p-methoxybenzene diazo mercapto) naphthalene, and 0.35 part of a tertiary $C_{12}$ alkyl mercaptan, all being parts by weight per 100 parts of monomeric material.

12. In the process of producing a synthetic rubber by the copolymerization in an aqueous emulsion of a monomeric material comprising a major amount of 1,3-butadiene and a minor amount of styrene, the improvement which comprises conducting said polymerization in the presence of 0.1 to 0.5 part of 2-(p-methoxybenzene diazo mercapto)-naphthalene, 0.05 to 0.5 part of a ferricyanide of an alkali metal, and 0.1 to 0.45 part of an alkyl mercaptan having between six and sixteen carbon atoms per molecule, all being parts by weight per 100 parts of monomeric material, and recovering a polymeric material so produced.

13. The process of claim 2 in which said polymerization is conducted in the presence of an alkaline-reacting material in an amount between 0.15 and 3 parts per 100 parts of monomers.

14. The process of claim 4 in which said polymerization is conducted in the presence of an alkaline-reacting material in an amount between 0.15 and 3 parts per 100 parts of monomers.

IZAAK M. KOLTHOFF.
WESLEY J. DALE.

REFERENCES CITED

The following references are of record in the file of this patent:

UNITED STATES PATENTS

| Number | Name | Date |
|---|---|---|
| 2,251,156 | Nygaard | July 29, 1941 |
| 2,375,987 | Garvey | May 15, 1945 |
| 2,379,687 | Crawford et al. | July 3, 1945 |
| 2,471,743 | Harrison | May 21, 1949 |

OTHER REFERENCES

Merck's Index, 4th ed., 1930, Merck & Co. Inc., N. J., page 412.